United States Patent
Yamaura et al.

(10) Patent No.: US 8,748,187 B2
(45) Date of Patent: Jun. 10, 2014

(54) CONTROL SYSTEM FOR NOX REMOVAL DEVICE, NOX REMOVAL DEVICE PROVIDED WITH THE SAME, BOILER PLANT PROVIDED WITH THE SAME, AND METHOD OF CONTROLLING NOX REMOVAL DEVICE

(75) Inventors: Taketoshi Yamaura, Tokyo (JP); Yoshihiro Deguchi, Tokyo (JP); Nobuyuki Ukai, Tokyo (JP); Susumu Okino, Tokyo (JP); Tatsuto Nagayasu, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 29 days.

(21) Appl. No.: 13/510,137

(22) PCT Filed: Jan. 6, 2011

(86) PCT No.: PCT/JP2011/050109
§ 371 (c)(1),
(2), (4) Date: May 16, 2012

(87) PCT Pub. No.: WO2011/105116
PCT Pub. Date: Sep. 1, 2011

(65) Prior Publication Data
US 2012/0230898 A1   Sep. 13, 2012

(30) Foreign Application Priority Data
Feb. 26, 2010   (JP) ................. 2010-043523

(51) Int. Cl.
*B01D 53/56* (2006.01)
*B01D 53/90* (2006.01)
*G01N 33/00* (2006.01)

(52) U.S. Cl.
USPC ............. 436/116; 436/55; 436/106; 436/118; 436/147; 436/164; 422/62; 422/82.09; 422/82.12; 422/83; 422/105; 422/111; 423/235

(58) Field of Classification Search
USPC ............. 436/50, 55, 106, 108, 113, 116, 118, 436/147, 155, 159, 164, 179, 181; 422/62, 422/68.1, 78, 80, 82.05, 82.09, 82.12, 83, 422/94, 105, 111; 423/235
See application file for complete search history.

(56) References Cited

U.S. PATENT DOCUMENTS 4,188,190 A * 2/1980 Muraki et al. ................ 436/55
5,576,970 A * 11/1996 Goto .............................. 700/274
(Continued)

FOREIGN PATENT DOCUMENTS

| EP | 2 357 331 | 8/2011 |
|----|-----------|--------|
| JP | 6-221932 | 8/1994 |

(Continued)

OTHER PUBLICATIONS

Decision to Grant a Patent issued Jul. 9, 2013 in corresponding Japanese Application No. 2010-043523.

(Continued)

*Primary Examiner* — Maureen Wallenhorst
(74) *Attorney, Agent, or Firm* — Wenderoth, Lind & Ponack, L.L.P.

(57) ABSTRACT

A control system of a NOx removal device is provided with reagent introducing means for introducing a reagent into a fluid, a temperature measuring device that measures a temperature distribution of the fluid, a reagent-concentration calculating portion that calculates a concentration distribution of the reagent introduced into the fluid with the temperature distribution determined at the temperature measuring device, a reagent-flow-rate determining portion that determines a flow rate of the reagent that the reagent introducing means introduces in accordance with the concentration distribution calculated at the reagent-concentration calculating portion, and a reagent-introducing-means control portion that controls the reagent introducing means so as to introduce the reagent into the fluid at the flow rate determined at the reagent-flow-rate determining portion.

8 Claims, 12 Drawing Sheets

(56) References Cited

U.S. PATENT DOCUMENTS

| | | | |
|---|---|---|---|
| 5,855,111 A * | 1/1999 | Oguchi et al. | 60/39.5 |
| 6,036,827 A | 3/2000 | Andrews et al. | |
| 6,638,487 B2 * | 10/2003 | Wakasa et al. | 423/235 |
| 7,635,593 B2 * | 12/2009 | Muzio et al. | 436/37 |
| 2007/0044456 A1 | 3/2007 | Upadhyay et al. | |
| 2009/0049828 A1 | 2/2009 | Wei et al. | |
| 2011/0150709 A1 | 6/2011 | Neu et al. | |
| 2011/0239629 A1 | 10/2011 | Tanoura et al. | |

FOREIGN PATENT DOCUMENTS

| | | |
|---|---|---|
| JP | 7-60066 | 3/1995 |
| JP | 8-233668 | 9/1996 |
| JP | 2003-290630 | 10/2003 |
| WO | 2009/025775 | 2/2009 |
| WO | 2010/015272 | 2/2010 |

OTHER PUBLICATIONS

European Search Report issued Nov. 13, 2013 in corresponding Application No. 11747080.7.

International Search Report and Written Opinion of the International Searching Authority issued Feb. 8, 2011 in International (PCT) Application No. PCT/JP2011/050109.

Masaharu Komiyama et al., "Temperature and Concentration Measurement of Water Vapor by Diode Laser Infrared Absorption Spectroscopy", Transactions of the Japan Society of Mechanical Engineers, Series B, vol. 68, No. 666, The Japan Society of Mechanical Engineers, Feb. 2002, pp. 294-299.

* cited by examiner

CONTROL SYSTEM FOR NOX REMOVAL DEVICE, NOX REMOVAL DEVICE PROVIDED WITH THE SAME, BOILER PLANT PROVIDED WITH THE SAME, AND METHOD OF CONTROLLING NOX REMOVAL DEVICE

TECHNICAL FIELD

The present invention relates to a control system for a NOx removal device, a NOx removal device provided with the same, a boiler plant provided with the same, and a method of controlling a NOx removal device, and it relates particularly to control of the concentration distribution of a reducing agent sprayed into exhaust gas.

BACKGROUND ART

Generally in a NOx removal device, a reducing agent is sprayed into exhaust gas in a smoke path, and nitrogen oxides contained in the exhaust gas are removed in the form of nitrogen and water by means of chemical reactions with a catalyst. The reducing agent sprayed into the exhaust gas evaporates, and the temperature of the exhaust gas is reduced at this time due to the latent heat of evaporation.

The spraying conditions of the reducing agent are adjusted by measuring the temperature of the exhaust gas into which the reducing agent is sprayed during a trial operation of the boiler plant. The NOx removal device is employed in the actual operation of the boiler plant in the same state as the state thereof after the spraying conditions of the reducing agent are adjusted during the trial operation of the boiler plant.

In the disclosures of Japanese Unexamined Patent Application, Publication No. Hei 8-233668 and Japanese Unexamined Patent Application, Publication No. Hei 6-221932, the temperature of the exhaust gas into which the reducing agent is sprayed is measured optically.

For controlling the spraying conditions of the reducing agent during the actual operation of the boiler plant, flow-rate control of the reducing agent sprayed into the exhaust gas is performed by measuring the nitrogen oxide concentration and reducing agent concentration (for example, Japanese Unexamined Patent Application, Publication No. Hei 7-60066 and Japanese Unexamined Patent Application, Publication No. 2003-290630).

However, with the inventions disclosed in Japanese Unexamined Patent Application, Publication No. Hei 7-60066 and Japanese Unexamined Patent Application, Publication No. 2003-290630, there is a problem in that the concentration distribution of the reducing agent does not reach a desired concentration distribution when a nozzle, etc. is blocked, even in the case in which the spraying level of the reducing agent is kept constant, and that the efficiency of the NOx removal devices consequently becomes inferior.

SUMMARY OF THE INVENTION

The present invention has been conceived in light of the above-described circumstances, and an object thereof is to provide a control system for a NOx removal device that is capable of making the concentration distribution of a reagent sprayed into a fluid reach a desired concentration distribution, a NOx removal device provided with the same, a boiler plant provided with the same, and a method of controlling a NOx removal device.

In order to solve the above-described problems, a control system for a NOx removal device of the present invention, a NOx removal device provided with the same, a boiler plant provided with the same, and a method of controlling a NOx removal device employ the following solutions.

Specifically, a control system for a NOx removal device according to a first aspect of the present invention is provided with reagent introducing means for introducing a reagent into a fluid; a temperature measuring device that measures a temperature distribution of the fluid; a reagent-concentration calculating portion that calculates a concentration distribution of the reagent introduced into the fluid with the temperature distribution determined at the temperature measuring device; a reagent-flow-rate determining portion that determines a flow rate of the reagent that the reagent introducing means introduces in accordance with the concentration distribution calculated at the reagent-concentration calculating portion; and a reagent-introducing-means control portion that controls the reagent introducing means so as to introduce the reagent into the fluid at the flow rate determined at the reagent-flow-rate determining portion.

The reagent introduced into the fluid evaporates and, at that time, takes heat away mainly as the latent heat of evaporation of a solvent (for example, water) contained in the reagent and the heat of vaporization or heat of sublimation of a solute (for example, muriate and ammonia), that is to say, decreases the temperature of the fluid by means of a temperature reduction. In the case in which the reagent is introduced in a gaseous form, the fluid temperature is also reduced by means of a temperature difference between the reagent temperature and the fluid temperature. Therefore, the fluid temperature locally decreases more at portions where a greater amount of the reagent is introduced as compared with other regions. In this way, the temperature distribution of the fluid reflects the flow rate distribution for the amount of reagent introduced, consequently reflecting the concentration distribution of the reagent. In other words, if a temperature distribution of the fluid reaches a desired temperature distribution, the flow rate distribution for the amount of reagent introduced can be considered to have a desired flow rate distribution, and the fluid and the reagent can be presumed to be in a desired mixed state.

Therefore, the concentration distribution is calculated for the reagent introduced into the fluid at the temperature distribution determined at the temperature measuring device, and the flow rate of the reagent introduced into the fluid is determined at the reagent-flow-rate determining portion. The reagent is introduced into the fluid at the determined flow rate by controlling the reagent introducing means with the reagent-introducing-means control portion. Accordingly, introduction conditions of the reagent to be introduced into the fluid can be corrected. Therefore, it is possible to cause the concentration distribution of the fluid, into which the reagent is introduced, to reach a desired concentration distribution.

The reagent introducing means may be, for example, a flow-rate control valve and a nozzle connected to the flow-rate control valve.

In the control system of the NOx removal device according to the first aspect of the present invention, it is preferable that reagent-concentration controlling means for controlling the concentration of the reagent introduced with the reagent introducing means be provided, wherein the reagent-concentration controlling means controls the flow rate of a diluting agent to be mixed with the reagent.

With this control system for a NOx removal device, because the flow rate of the diluting agent to be mixed with the reagent is controlled with the reagent-concentration controlling means, the reagent concentration can be changed without changing the flow rate of the reagent to be introduced into the fluid. Therefore, the droplet size of the reagent to be introduced into the fluid can be kept small and substantially uniform.

The reagent-concentration controlling means may be, for example, a flow-rate control valve or a pump.

Furthermore, in the control system of the NOx removal device according to the first aspect of the present invention, it is preferable that the temperature measuring device be provided with a photoreceptor provided at one wall surface of a flow path in which the fluid flows; a dispersive element that disperses light that enters the photoreceptor, where the light emitted from the other wall surface passes through the fluid and enters the photoreceptor; a detecting portion that detects an actual measured absorption spectrum of the fluid from the light dispersed at the dispersive element; and a temperature calculating portion that calculates the temperature of the fluid from the actual measured absorption spectrum detected with the detecting portion.

With this control system for a NOx removal device, because the temperature distribution of the fluid is measured by disposing only the photoreceptors in a flow path, the flow of the fluid in the flow path is not hindered. Therefore, the temperature distribution of the fluid can be measured constantly. In addition, because the light that is emitted from the wall surface and that has passed through the fluid is measured, there is no need to employ a configuration in which the fluid is irradiated with light to be measured. Accordingly, the temperature measuring device includes a small number of constituent components. Therefore, the temperature distribution can be measured easily and at low-cost.

A NOx removal device according to a second aspect of the present invention is provided with any one of the above-described control systems, a plurality of nozzles to which the reagent whose flow rate is controlled with the control system is guided, and a catalyzing portion that removes nitrogen oxides in the fluid sprayed with the plurality of nozzles.

With this NOx removal device, because the control system that can correct the concentration distribution of the reagent to be sprayed into the fluid is employed, the concentration distribution of the reagent to be sprayed into the fluid can be appropriately controlled, and the fluid can be guided to the catalyzing portions in a desired mixed state. Therefore, the performance of the NOx removal device can be improved, and the NOx removal efficiency can be enhanced.

In addition, at portions of the fluid where the temperature thereof is locally high, the nozzles thereof are presumably blocked, and, in the case in which the measured temperature distribution does not reach the desired temperature distribution, the mixed state is presumed to be uneven. Accordingly, maintenance can be quickly performed on the NOx removal device. Therefore, the reliability of the operation of the NOx removal device can be enhanced.

In addition, because the control system is employed, with which the desired mixed state can be achieved between the reagent and the fluid by controlling the spraying level of the reagent, it is possible to prevent excessive introduction of the reagent. Therefore, it is possible to prevent the reagent unused in the reactions at the catalyzing portions from flowing out from the NOx removal device.

In addition, in the case in which the concentration control for the reagent to be sprayed is added, the droplet size of the reagent to be introduced into the fluid can be kept small and substantially uniform. Accordingly, the reagent introduced into the fluid can be sufficiently evaporated. Therefore, the NOx removal efficiency can be further enhanced.

In the NOx removal device according to the second aspect of the present invention, it is preferable that the reagent be one of ammonia, a mixture of ammonia and hydrogen chloride, aqueous ammonia solution, aqueous urea solution, and aqueous ammonium chloride solution.

With this NOx removal device, because the concentration distribution is controlled for one of ammonia, a mixture of ammonia and hydrogen chloride (for example, ammonium chloride), aqueous ammonia solution, aqueous urea solution, and aqueous ammonium chloride solution that is introduced into the fluid, the fluid into which the reagent is sprayed can be sufficiently reacted with the catalyzing portions. Therefore, it is possible to provide a NOx removal device that can efficiently remove mercury in the fluid together with the removal of the nitrogen oxides.

A boiler plant according to a third aspect of the present invention is provided with a boiler that discharges a fluid; the above-described NOx removal device to which the fluid discharged from the boiler is guided; and a heat exchanger that performs heat exchange with the fluid that has flowed out from the NOx removal device.

With this boiler plant, because the NOx removal device that can prevent the reagent unused in the reactions from flowing out is employed, it is possible to prevent the reagent from forming deposits at the heat exchanger to which the fluid is guided from the NOx removal device, thus blocking the heat exchanger. Therefore, the reliability of the plant operation can be enhanced, and the maintenance thereof can be simplified.

In addition, because the NOx removal device that achieves excellent nitrogen oxide removal is employed, it is possible to considerably reduce the nitrogen oxides that flow out from the boiler plant. Therefore, it is possible to provide a boiler plant with a low environmental load.

A method of controlling a NOx removal device according to a fourth aspect of the present invention includes a reagent introducing step of introducing a reagent into a fluid; a temperature measuring step of measuring a temperature distribution of the fluid; a reagent-concentration calculating step of calculating a concentration distribution of the reagent introduced into the fluid with the temperature distribution determined in the temperature measuring step; a reagent-introducing-flow-rate determining step of determining a flow rate of the reagent introduced in accordance with the concentration distribution calculated in the reagent-concentration calculating step; and a reagent introducing means controlling step of introducing the reagent into the fluid at the flow rate determined in the reagent-introducing-flow-rate determining step.

The concentration distribution is calculated for the reagent introduced to the fluid with the temperature distribution determined at the temperature measuring device, and the flow rate of the reagent introduced to the fluid is determined at the reagent-flow-rate determining portion. The reagent of the determined flow rate is introduced to the fluid by controlling the reagent introducing means with the reagent-introducing-means control portion. Accordingly, introduction conditions of the reagent to be introduced to the fluid can be corrected. Therefore, it is possible to cause the concentration distribution of the fluid, into which the reagent is introduced, to reach a desired concentration distribution.

DETAILED DESCRIPTION OF THE INVENTION

First Embodiment

Figure 1:
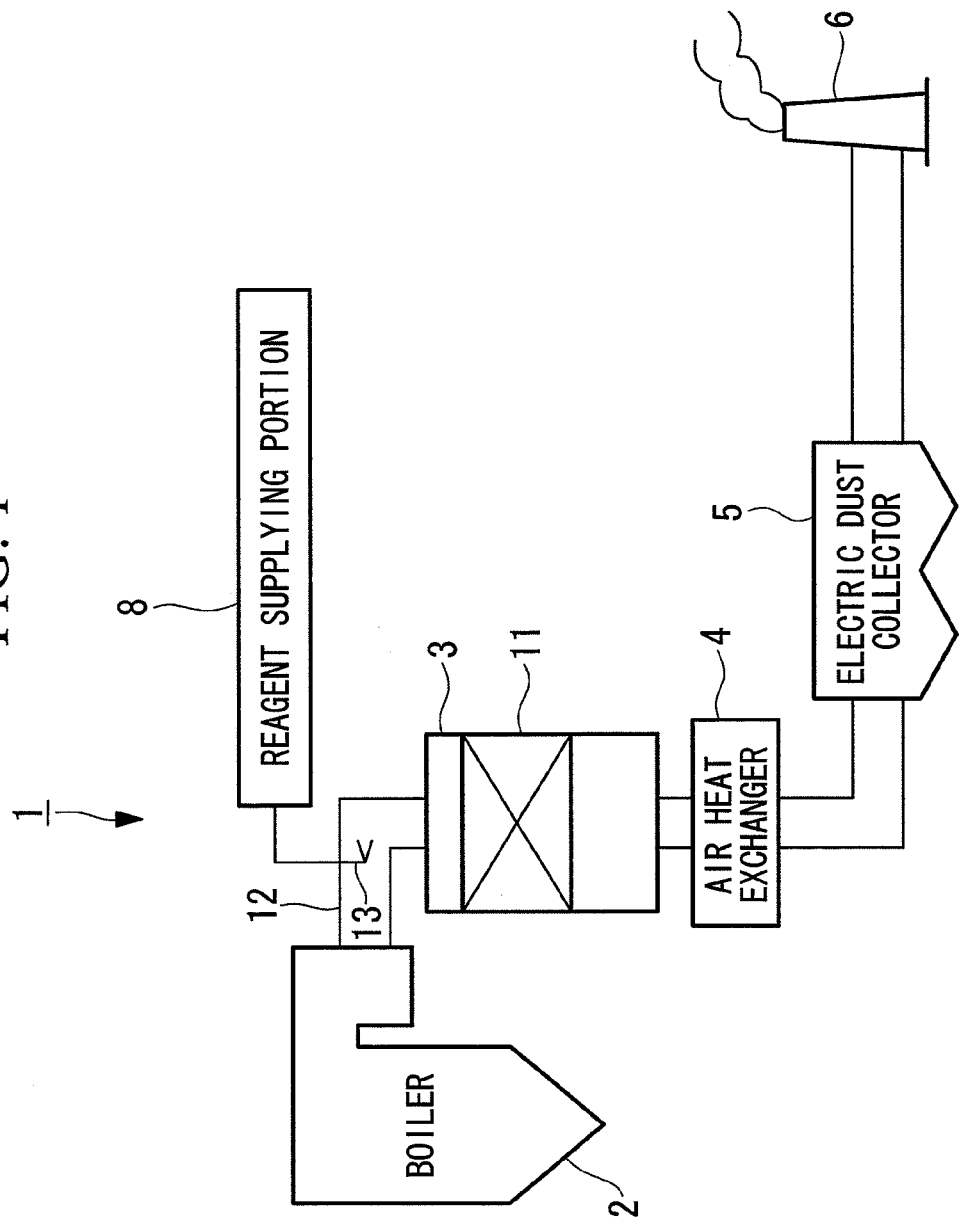
FIG. 1 is a configuration diagram showing, in outline, a boiler plant provided with a NOx removal device according to a first embodiment of the present invention.

FIG. 1 is a configuration diagram showing, in outline, a boiler plant according to this embodiment.

A boiler plant 1 is provided with a boiler 2 that discharges exhaust gas (fluid), a NOx removal device 3 to which the exhaust gas discharged from the boiler 2 is guided, an air heat exchanger (heat exchanger) 4 in which the exhaust gas that has flowed out from the NOx removal device 3 undergoes heat exchange with air, an electric dust collector 5 that removes dust in the exhaust gas whose temperature is lowered at the air heat exchanger 4, and a chimney 6 through which the exhaust gas purified at the NOx removal device 3 and the electric dust collector 5 is guided outside the boiler plant 1.

The boiler 2 combusts fuel and discharges the exhaust gas. The air heat exchanger 4 uses air as coolant to perform heat exchange with the exhaust gas. By passing through the air heat exchanger 4, the temperature of the exhaust gas is lowered.

The electric dust collector 5 removes dust in the exhaust gas.

The NOx removal device 3 removes nitrogen oxides in the exhaust gas. The NOx removal device 3 is provided with a catalyst (catalyzing portion) 11, a nozzle (reagent-introducing-means control portion) 13 that sprays a reducing agent, and a control system (not shown). The catalyst 11 reacts with the nitrogen oxides in the exhaust gas when the exhaust gas sprayed with ammonia solution (reagent), which is the reducing agent, passes therethrough to turn the nitrogen oxides into harmless nitrogen and water. A plurality of the catalysts 11 having honeycomb structures are provided. The catalysts 11 contain titanium dioxide ($TiO_2$) as a main component, and vanadium (V), tungsten (W), etc., which are active components, are added thereto. Note that there two types of reducing agents, i.e., a gaseous form and a liquid form; the gaseous form may be ammonia or a mixture of ammonia and hydrogen chloride (for example, ammonium chloride), and the liquid form may be aqueous ammonia solution, aqueous urea solution, or aqueous ammonium chloride solution. Although the gaseous form and the liquid form are both applicable, descriptions herein will be given with the aqueous ammonia solution (ammonia solution) as an example.

Figure 2:
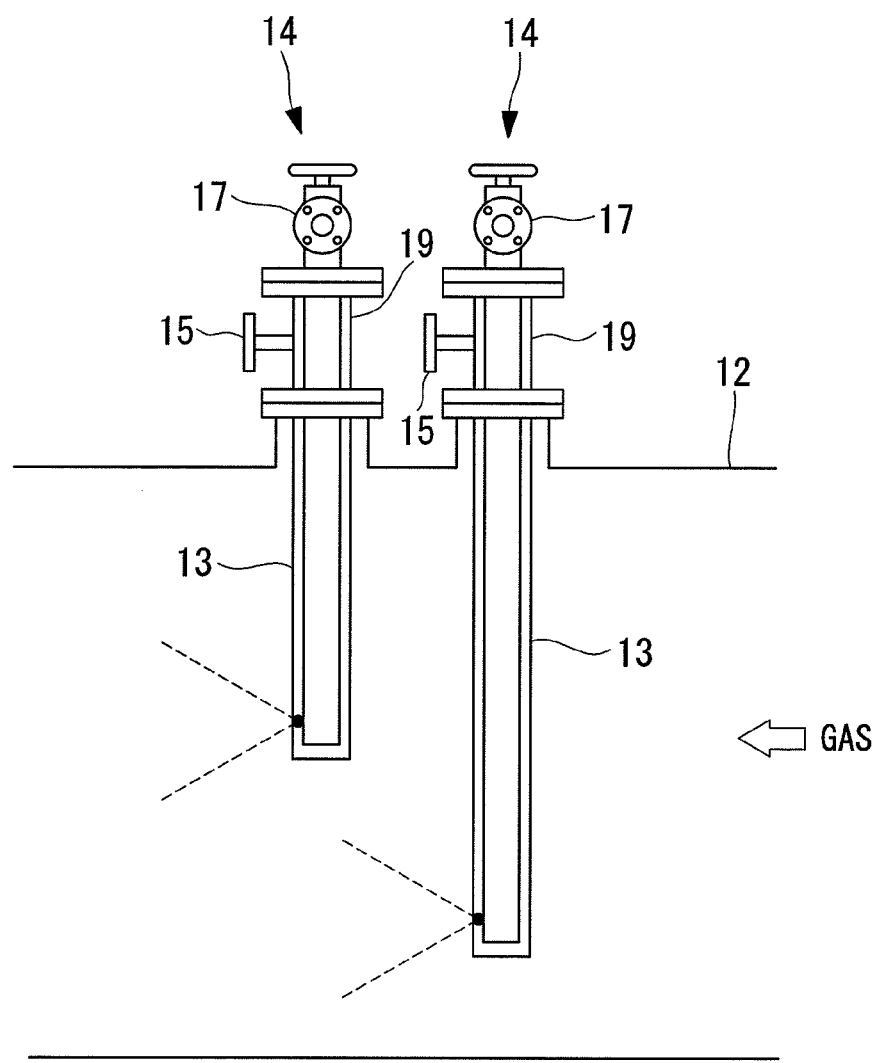
FIG. 2 is a diagram showing the placement of nozzles provided in the NOx removal device shown in FIG. 1.

The nozzle 13 sprays ammonia into the exhaust gas flowing in a duct 12. A reagent supplying portion 8 supplies ammonia solution, which is the reducing agent, to the nozzle 13. The nozzle 13 is provided in the duct 12 on the upstream side of the catalysts 11. A plurality of nozzles 13 are provided widthwise in the duct 12. Furthermore, multiple stages (for example, two stages) of nozzles 13 are provided in a direction in which the exhaust gas passes (direction in which the duct 12 extends), as shown in FIG. 2.

The nozzles 13 have rectangular cross-sectional shapes in the directions in which they extend. The nozzles 13 extend downward in the duct 12. As for the lengths of the nozzles 13, the lengths thereof differ depending on the stages. By employing the nozzles 13 with different lengths, the ammonia solution can be sprayed into the exhaust gas that passes through planes perpendicular to the direction in which the duct 12 extends. The individual nozzles 13 are connected to an injection pipe 14 disposed outside the duct 12. Flow-rate control valves (reagent-introducing-means control portions) 15 are provided between the injection pipe 14 and the individual nozzles 13.

Figure 3:
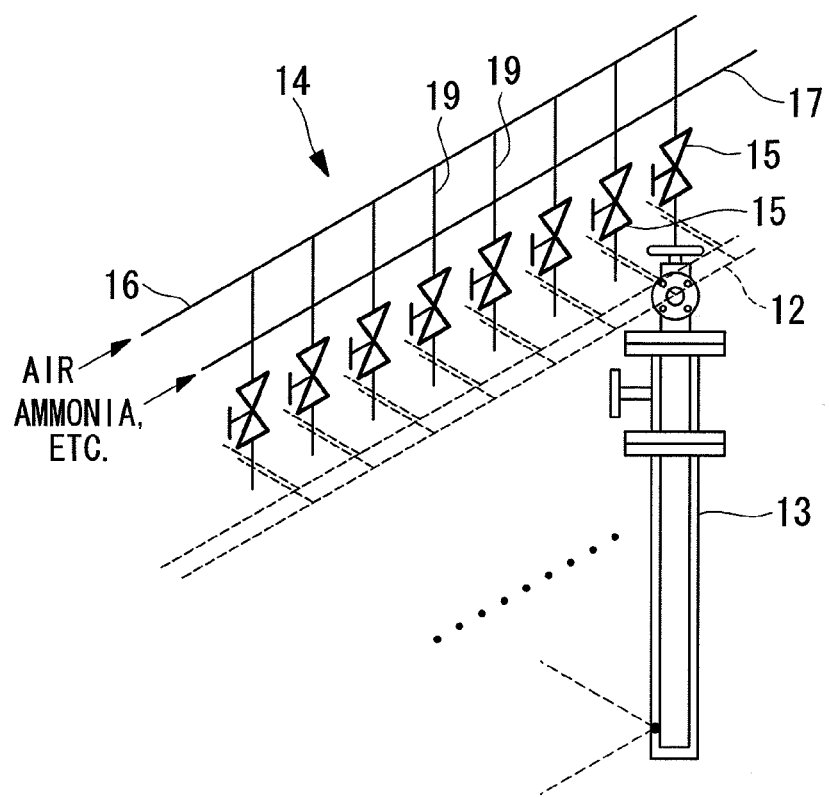
FIG. 3 is a diagram showing the placement of an injection pipe that supplies reducing agent to the nozzles shown in FIG. 2.

As shown in FIG. 3, the injection pipe 14 extends widthwise in the duct 12. The injection pipe 14 is provided with an air injection pipe 16 and a reducing-agent injection pipe 17. The reducing-agent injection pipe 17 is provided below the air injection pipe 16 so as to be parallel therewith. The air injection pipe 16 has a plurality of reducing-agent-injection branch pipes 19 that are directed downward. The reducing-agent injection pipe 17 joins at intermediate points of the individual reducing-agent-injection branch pipes 19. The nozzles 13 are individually connected, via the flow-rate control valves 15, to bottom ends of the individual reducing-agent-injection branch pipes 19 where the reducing agent injection pipe 17 is joined.

The individual flow-rate control valves 15 are provided between the individual reducing-agent-injection branch pipes 19 and the individual nozzles 13. The flow-rate control valves 15 are provided in the same number as the nozzles 13. The flow-rate control valves 15 control the flow rate of the ammonia solution to be guided to the nozzles 13.

Figure 4:
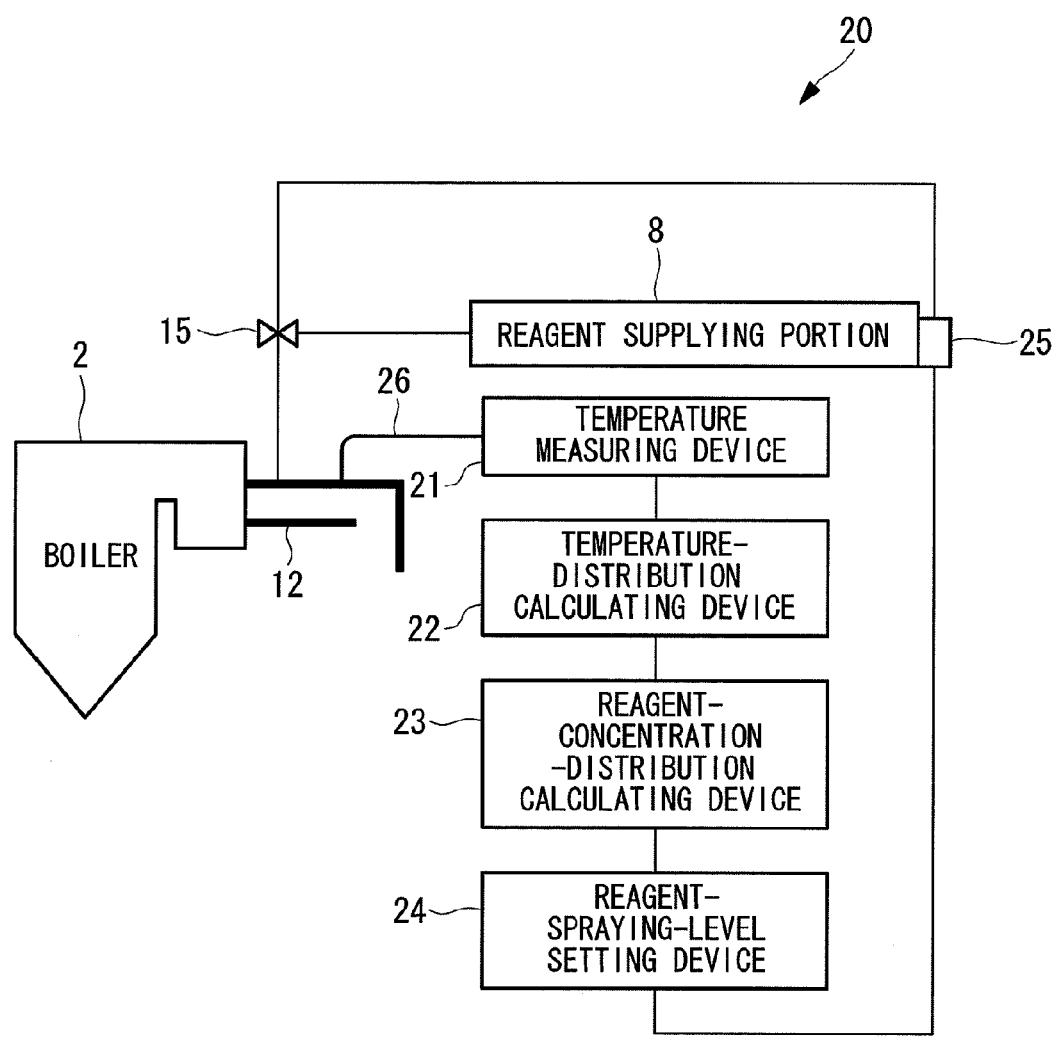
FIG. 4 is a configuration diagram showing, in outline, a control system for the NOx removal device according to the first embodiment of the present invention.

FIG. 4 is a configuration diagram showing, in outline, the control system in this embodiment.

The control system 20 is provided with a temperature measuring device 21, a temperature-distribution calculating device 22 that calculates a temperature distribution, a reagent-concentration-distribution calculating device (reagent-concentration calculating portion) 23 that calculates an ammonia concentration distribution in the aqueous ammonia solution, a reagent-spraying-level setting device (reagent-flow-rate determining portion) 24 that sets a spraying level of the ammonia solution, and a valve control device (reagent-introducing-means control portion) 25 that controls the degrees of opening of the flow-rate control valves 15.

Figure 5:
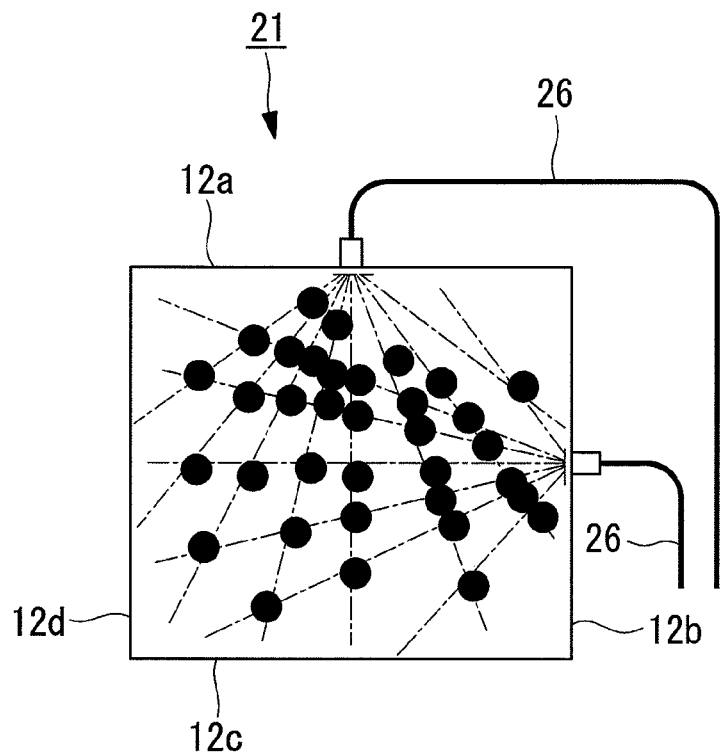
FIG. 5 is a configuration diagram showing, in outline, a temperature measuring device shown FIG. 4.

As shown in FIG. 5, the temperature measuring device 21 measures the temperature distribution of the exhaust gas sprayed with the ammonia solution by employing optical fibers (photoreceptors) 26. The optical fibers 26 are provided at a wall surface 12a forming the duct 12 (see FIG. 4) and a wall surface 12b adjacent to that wall surface 12a.

Light that is emitted from other wall surfaces 12c and 12d and that has passed through the exhaust gas flowing in the duct 12 enters the optical fibers 26. Accordingly, a component contained in the exhaust gas, for example, vapor, absorbs a portion of the light that enters the optical fibers 26. The light that has entered the optical fibers 26 is guided to the temperature measuring device 21.

The light guided to the temperature measuring device 21 is dispersed by a dispersive element (not shown) provided in the temperature measuring device 21. The dispersed light is guided to an analyzing portion (not shown) provided in the temperature measuring device 21. The analyzing portion obtains a function of the signal intensity with respect to a predetermined wavelength from an emission spectrum RS that is actually measured (hereinafter, referred to as "actual measured emission spectrum"). The actual measured emission spectrum RS is a combination of an emission spectrum of the light emitted from the wall surfaces 12c and 12d and an absorption spectrum with respect to the exhaust gas flowing in the duct 12.

Furthermore, the analyzing portion obtains the function of signal intensity with respect to the predetermined wavelength described above for an absorption spectrum in theory (hereinafter, referred to as "theoretical absorption spectrum") of vapor contained in the exhaust gas flowing in the duct 12. The signal intensity of the theoretical absorption spectrum of the vapor can be obtained as a function of the predetermined wavelength and vapor temperature at a certain temperature measuring position in the duct 12.

The analyzing portion uses the signal intensity of the above-described theoretical absorption spectrum of the vapor to calculate a vapor temperature where an error between the theoretical absorption spectrum at the certain temperature measuring position in the duct 12 and the actual measured emission spectrum RS thereof is minimized. In this way, the temperature measuring device 21 can estimate the temperature by using the intensity of light absorbed by the vapor or the like.

The temperature-distribution calculating device 22 (see FIG. 4) calculates the temperature distribution of the exhaust gas sprayed with the ammonia solution on the basis of exhaust-gas wavelength from the measurement result at the temperature measuring device 21.

The reagent-concentration-distribution calculating device 23 calculates the concentration distribution of ammonia sprayed into the exhaust gas on the basis of the exhaust-gas temperature distribution calculated at the temperature-distribution calculating device 22.

The reagent-spraying-level setting device 24 determines the spraying level to be sprayed into the exhaust gas from the result for the ammonia concentration distribution calculated by the reagent-concentration-distribution calculating device 23.

The valve control device 25 controls the degree of opening of each flow-rate control valve 15 in accordance with the spraying level determined at the reagent-spraying-level setting device 24. Accordingly, the flow rates of ammonia solution sprayed into the exhaust gas from the individual flow-rate control valves 15 are made different for each flow-rate control valve 15.

Next, a method of controlling the spraying level of the ammonia solution in this embodiment will be described.

The ammonia solution is sprayed into the exhaust gas discharged from the boiler 2 from the top of the duct 12 with the plurality of nozzles 13 (see FIG. 1). The exhaust gas sprayed with the ammonia solution flows in the duct 12 to be guided to the NOx removal device 3 (see FIG. 1).

The temperature of the exhaust gas sprayed with the ammonia solution is measured with the optical fibers 26 and the temperature measuring device 21 on the upstream side when it is guided to the NOx removal device 3. On the basis of the temperature estimated with the temperature measuring device 21, the temperature-distribution calculating device 22 calculates the exhaust-gas temperature distribution.

On the basis of the exhaust-gas temperature distribution calculated at the temperature-distribution calculating device 22, the reagent-concentration-distribution calculating device 23 calculates the concentration distribution of the ammonia applied to the exhaust gas. On the basis of the calculation result of the ammonia concentration distribution in the exhaust gas, in the case in which the ammonia concentration distribution does not reach a desired concentration distribution, the reagent-spraying-level setting device 24 determines the spraying level of the ammonia solution to be sprayed from the individual nozzles 13 (see FIG. 1). In addition, the reagent-spraying-level setting device 24 determines the degrees of opening of the individual flow-rate control valves 15 so that the ammonia solution is sprayed into the exhaust gas flowing in the duct 12 from the individual nozzles 13 at the determined spraying level.

The valve control device 25 controls the individual flow-rate control valves 15 on the basis of the degrees of opening determined at the reagent-spraying-level setting device 24. By doing so, the spraying levels of the ammonia solution can be reduced for portions where the spraying levels of the ammonia solution sprayed into the exhaust gas from the individual nozzles 13 (see FIG. 3) are calculated to be high at the reagent-concentration-distribution calculating device 23, and, for the portions where the spraying levels of the ammonia solution sprayed into the exhaust gas are calculated to be low, the ammonia solution can be sprayed thereinto by increasing the spraying levels.

Here, a method of determining the spraying level of the ammonia solution will be described.

The nitrogen oxide level (mol/h) in the exhaust gas guided into the duct 12 from the boiler 2 can be determined from the relationships between the flow speed and the nitrogen-oxide concentration on the upstream side of the NOx removal device 3 before the ammonia solution is sprayed.

Supply levels of the ammonia solution to be supplied to the individual nozzles 13 are adjusted so as to reach desired supply levels so that a ratio of the supply level N (mol/L) of the ammonia solution to the nitrogen oxide level (mol/h) in the exhaust gas determined from these relationships approaches 1. However, in the case in which the spraying concentration of the ammonia solution sprayed into the exhaust gas does not reach the desired concentration distribution, even when the ammonia solution is supplied in the desired supply level, it is desirable that the spraying level be changed to achieve the desired concentration distribution with the spraying concentration of the ammonia solution.

It is generally known that, when evaporated, the ammonia solution sprayed into the exhaust gas reduces the temperature of the exhaust gas by means of the latent heat of evaporation.

Figure 6:
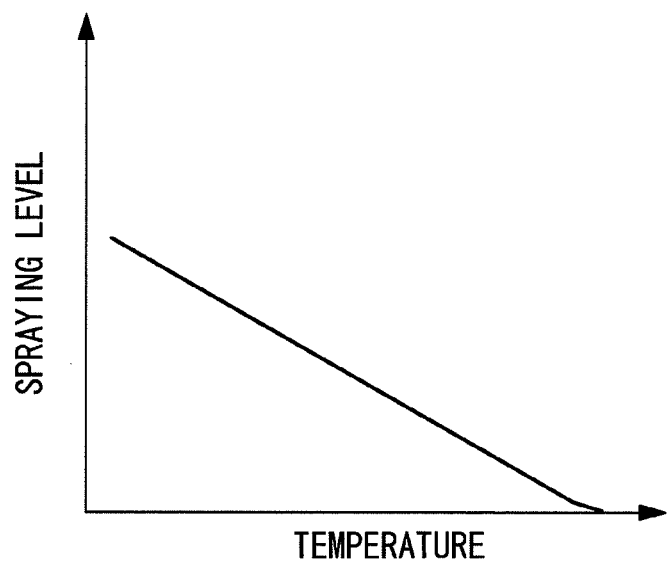
FIG. 6 is a graph showing the relationship between temperature and spraying level of ammonia solution.

FIG. 6 shows a graph showing the temperature of the exhaust gas and the spraying level of the ammonia solution. The vertical axis in FIG. 6 indicates the spraying level of the ammonia solution, and the horizontal axis indicates the temperature of the exhaust gas sprayed with the ammonia solution. As shown in FIG. 6, the temperature of the exhaust gas decreases with an increase in the spraying level of the ammonia solution due to an increase in the latent heat of evaporation.

By using the relationship shown in FIG. 6, the temperature distribution of the exhaust gas sprayed with the ammonia solution is measured to calculate the concentration distribution of the ammonia sprayed into the exhaust gas.

Note that, in the case in which ammonia gas is sprayed into the exhaust gas, because a temperature reduction due to the latent heat of evaporation does not occur, it is preferable that cooling means be provided on the upstream side of the nozzles 13 so as to spray the exhaust gas with cooled ammonia gas. Because a temperature difference increases with an increase in the spraying level of the ammonia gas, the temperature of the exhaust gas decreases. By obtaining the relationship between the exhaust-gas temperature and the spraying level of the ammonia gas as data for each ammonia-gas temperature, the concentration distribution can be calculated for the ammonia sprayed into the exhaust gas by measuring the temperature distribution of the exhaust gas sprayed with the ammonia gas.

Figure 7:
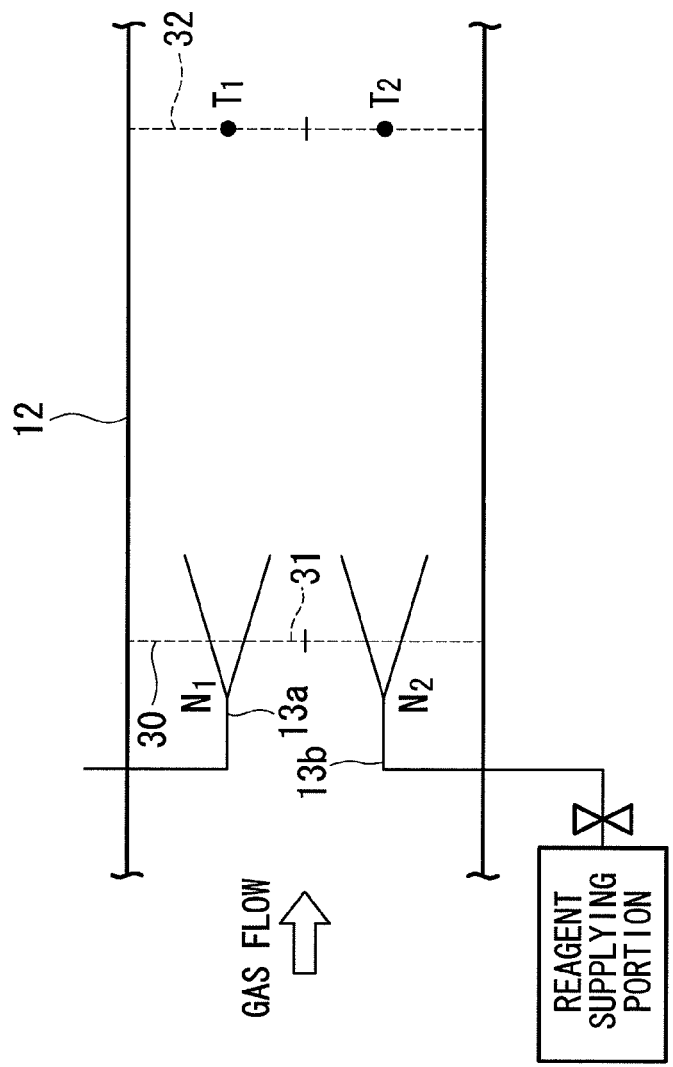
FIG. 7 is a schematic diagram showing the relationship between temperature distribution of exhaust gas that flows in a duct and the spraying level of ammonia solution.

FIG. 7 shows a schematic diagram showing the relationship between the temperature distribution of the exhaust gas flowing in the duct and the spraying level of the ammonia solution.

For the case in which the ammonia solution is sprayed at a supply level Nave (mol/L) with respect to the nitrogen oxide level (mol/h) contained in the exhaust gas before the ammonia solution is sprayed thereinto, a theoretical average temperature reduction of the ammonia solution is defined as $\Delta Tave$, and a theoretical average reduced temperature of the exhaust gas to be measured is defined as Tave.

Here, descriptions will be given assuming that the interior of the duct 12 is divided into two, as simply shown in FIG. 7.

In the duct 12, which is divided into two, i.e., a region 30 and a region 31, one nozzle 13 is provided in each of the regions 30 and 31. The actual spraying level of the ammonia solution sprayed from the nozzle 13a provided in the region 30 into the exhaust gas flowing in the duct 12 is assumed to be N1 (mol/L). The actual spraying level of the ammonia solution sprayed from the nozzle 13b provided in the region 31 to the exhaust gas flowing in the duct 12 is assumed to be N2 (mol/L).

Temperatures of the region 30 and the region 31 at a plane 32, which is perpendicular to the direction in which the duct 12 extends and which is located on the downstream side of the flow of the exhaust gas, are assumed to be T1 and T2, respectively. Note that the temperatures T1 and t2 are measured at substantially the same positions as the positions where the nozzles 13a and 13b provided in the individual regions 30 and 31 spray the ammonia solution.

As shown in the graph in FIG. 6, it is possible to determine the concentration distribution of the ammonia sprayed into the exhaust gas from the measurement results of the individual temperatures T1 and T2. In the case in which the concentration distribution of the ammonia does not reach the desired concentration distribution, the spraying levels N1 and N2 of the ammonia solution to be sprayed into the exhaust gas in the individual regions 30 and 31 are changed.

Each of the temperature reductions $\Delta T1$ and $\Delta T2$ can be determined from the measurement results of the individual temperatures T1 and T2. From these, spraying-level changes $\Delta N1$ and $\Delta N2$ can be determined for the ammonia solution. By changing the spraying-level changes $\Delta N1$ and $\Delta N2$ of the ammonia solution, it is possible to make the individual temperatures T1 and T2 approach the theoretical average reduced temperature Tave of the exhaust gas.

In reality, however, the temperature reduction $\Delta T1$ of the exhaust gas in the region 30 is affected not only by the spraying-level change $\Delta N1$ of the ammonia solution but also by the spraying-level change $\Delta N2$ of the ammonia solution in the region 31. In addition, the temperature reduction $\Delta T2$ of the exhaust gas in the region 31 is affected not only by the spraying-level change $\Delta N2$ of the ammonia solution but also by the spraying-level change $\Delta N1$ of the ammonia solution in the region 30. Because of this, by changing the individual spraying levels N1 and N2 of the ammonia solution by adding correction terms in consideration of these effects, it is possible to make the temperatures T1 and T2 of the individual regions 30 and 31 approach the average reduced temperature Tave.

As has been described above, the control system of the NOx removal device according to this embodiment, the NOx removal device provided with the same, the boiler plant provided with the same, and the method of controlling the NOx removal device afford the following operational advantages.

The concentration distribution of the ammonia solution (reagent) sprayed (introduced) to the exhaust gas (fluid) is calculated from the temperature distribution determined at the temperature measuring device 21, and the flow rates of the ammonia solution to be sprayed into the exhaust gas are determined at the reagent-flow-rate setting device (reagent-flow-rate determining device) 24. The ammonia solution is sprayed into the exhaust gas at the determined flow rates by controlling the flow-rate control valves (reagent introducing means) 15 with the valve control device (reagent-introducing-means control portion) 25. Accordingly, it is possible to correct the spraying conditions of the ammonia solution to be sprayed into the exhaust gas. Therefore, it is possible to make the concentration distribution of the exhaust gas sprayed with the ammonia solution reach the desired concentration distribution.

The temperature distribution of the exhaust gas is measured by disposing only the optical fibers (photoreceptors) 26 in the duct 12. Because of this, the flow of the exhaust gas in the duct 12 is not hindered. Therefore, it is possible to constantly measure the temperature distribution of the exhaust gas.

In addition, because the light that is emitted from the wall surfaces 12c and 12d of the duct 12 and passed through the exhaust gas is measured, there is no need to employ a configuration in which the exhaust gas is irradiated with light to be measured. Accordingly, the temperature measuring device 21 includes a small number of constituent components. Therefore, the temperature distribution can be measured easily and at low-cost.

The control system 20 that can correct the concentration distribution of ammonia to be sprayed into the exhaust gas is employed. Accordingly, the concentration distribution of the ammonia to be sprayed into the exhaust gas can be appropriately controlled, and the exhaust gas can be guided to the catalysts (catalyzing portions) 11 in a desired mixed state with the ammonia solution. Therefore, the performance of the NOx removal device 3 can be improved, and the NOx removal efficiency can be enhanced.

In addition, at portions of the exhaust gas where the temperatures thereof are locally high, the nozzles 13 thereof are presumably blocked, and, in the case in which the measured temperature distribution does not reach the desired temperature distribution, the mixed state between the exhaust gas and the ammonia solution is presumed to be uneven. Accordingly, maintenance can be quickly performed on the NOx removal device 3. Therefore, the reliability of the operation of the NOx removal device 3 can be enhanced.

In addition, because the control system 20 is employed, with which the desired mixed state can be achieved between the ammonia solution and the exhaust gas by controlling the spraying level of the ammonia solution, it is possible to prevent excessive spraying of the ammonia solution. Therefore, it is possible to prevent ammonia unused in the reactions at the catalysts 11 from flowing out from the NOx removal device 3.

The NOx removal device 3 is employed, with which it is possible to prevent ammonia unused in the reactions from flowing out. Accordingly, it is possible to prevent the ammonia from forming deposits at the air heat exchanger (heat exchanger) 4 to which the exhaust gas is guided from the NOx removal device 3, thus blocking the air heat exchanger 4. Therefore, the reliability of the operation of the boiler plant 1 can be enhanced, and the maintenance thereof can be simplified.

In addition, because the NOx removal device 3 that achieves excellent nitrogen oxide removal is employed, it is possible to considerably reduce the nitrogen oxides that flow out from the boiler plant 1. Therefore, it is possible to provide a boiler plant 1 with a low environmental load.

Note that, although this embodiment is described in terms of the boiler plant 1, the present invention is not limited thereto, and it may be applied to a chemical plant or the like.

Figure 8:
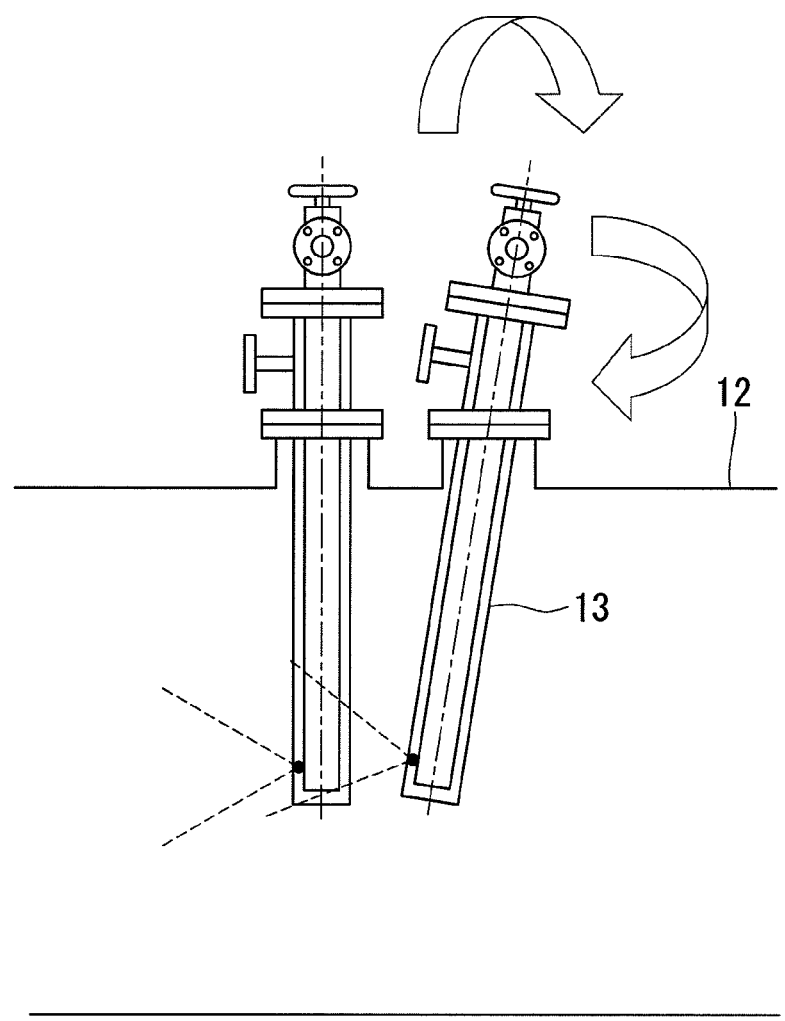
FIG. 8 is a modification of the arrangement of the nozzles according to the first embodiment of the present invention.

In addition, the nozzles 13 may be provided so that the inclinations thereof are changed as shown in FIG. 8.

Second Embodiment

A second embodiment of the present invention will be described below. A control system of a NOx removal device according to this embodiment, a NOx removal device provided with the same, a boiler plant provided with the same, and a method of controlling a NOx removal device differ from those of the first embodiment in that reagent-concentration controlling means is provided, and other components are the same. Therefore, the same reference signs are given to the same structures and control methods, and descriptions thereof will be omitted.

Figure 9:
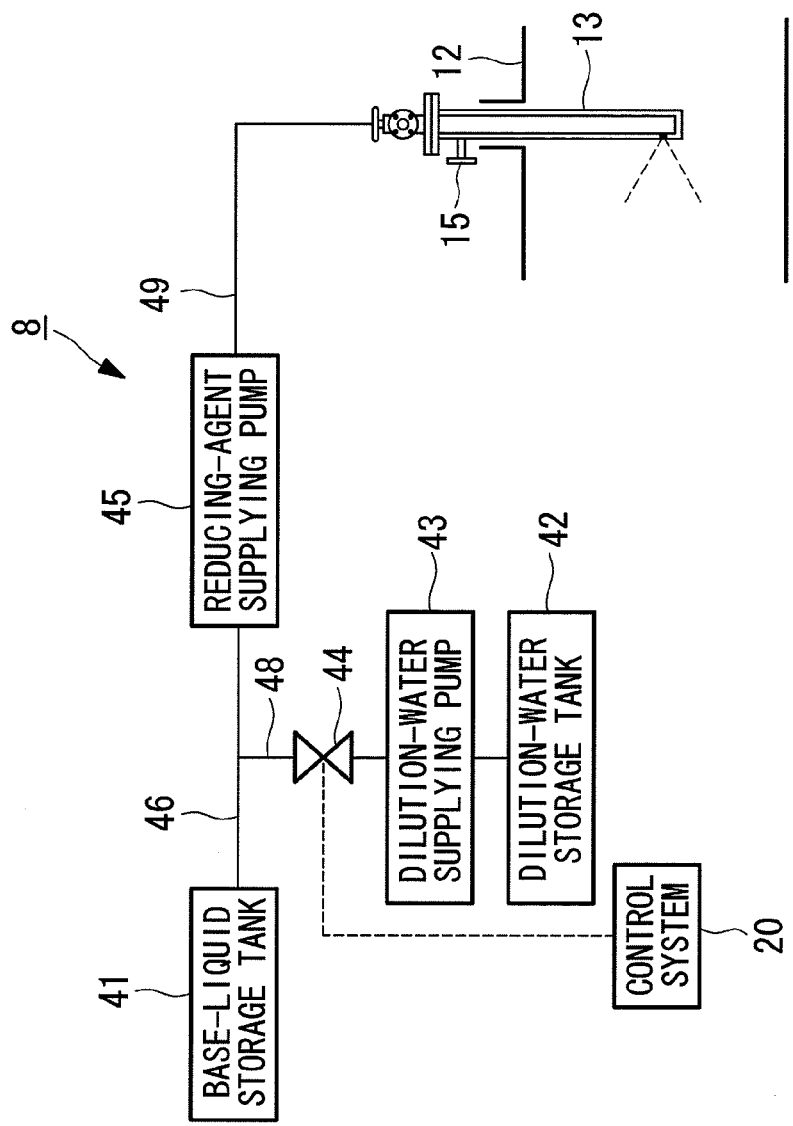
FIG. 9 is a configuration diagram showing, in outline, a NOx removal device provided with reagent-concentration controlling means according to a second embodiment of the present invention.

FIG. 9 is a configuration diagram showing, in outline, a NOx removal device provided with the reagent-concentration controlling means according to the second embodiment of the present invention.

Here, a two-liquid mixed system is employed for ammonia (reagent) which is the reducing agent, wherein ammonia, which is a base liquid, is mixed with dilution water (diluting agent) for diluting the base liquid. The concentration of the ammonia to be sprayed into the exhaust gas can be changed by increasing/decreasing the amount of dilution water.

The reagent supplying portion 8 that supplies ammonia to the nozzles 13 is provided with a base-liquid storage tank 41, a dilution-water storage tank 42, a dilution-water supplying pump 43 that pressurizes the dilution water, a dilution-water-flow-rate control valve (reagent-concentration controlling means) 44 that controls the flow rate of the dilution water, the control system 20 that controls the degree of opening of the dilution-water-flow-rate control valve 44, and a reducing-agent supplying pump 45 that supplies ammonia to the individual nozzles (reagent introducing means) 13 via the individual flow-rate control valves (reagent introducing means) 15.

The base-liquid storage tank 41 stores the ammonia base liquid. The base-liquid storage tank 41 is connected to a pipe 46 that connects it with the reducing-agent supplying pump 45.

The dilution-water storage tank 42 stores the dilution water that dilutes the ammonia base liquid.

The dilution-water supplying pump 43 pressurizes the dilution water guided thereto from the dilution-water storage tank 42. The dilution-water-flow-rate control valve 44 is provided on the downstream side of the dilution-water supplying pump 43.

The reducing-agent supplying pump 45 pressurizes ammonia of a predetermined concentration guided thereto from the pipe 46. A pipe 49 connected to the individual flow-rate control valves 15 is connected on the downstream side of the reducing-agent supplying pump 45.

The dilution-water-flow-rate control valve 44 changes the flow rate of the dilution water that passes therethrough by changing the degree of opening thereof. A pipe 48 is connected on the downstream side of the dilution-water-flow-rate control valve 44. The pipe 48 joins with the pipe 46.

The control system 20 is provided with a dilution-water-flow-rate-control-valve control device (not shown) that controls the degree of opening of the dilution-water-flow-rate control valve 44.

Next a control method of this embodiment with which ammonia is mixed to have a predetermined concentration will be described.

The ammonia base liquid is pumped out from the base-liquid storage tank 41 to the pipe 46 by the reducing-agent supplying pump 45. On the other hand, the dilution water is guided from the dilution-water storage tank 42 to the dilution-water supplying pump 43 to be pressurized therein. The pressurized dilution water is guided to the dilution-water-flow-rate control valve 44.

The degree of opening of the dilution-water-flow-rate control valve 44 is controlled by the dilution-water-flow-rate-control-valve control device provided in the control system 20. The degree of opening of the dilution-water-flow-rate control valve 44 is controlled so as to make ammonia guided from the pipe 49 to the nozzles 13 reach a desired concentration. The dilution water with the controlled flow rate is guided out to the pipe 48 from the dilution-water-flow-rate control valve 44 whose degree of opening is controlled with the dilution-water-flow-rate-control valve control device.

The dilution water with the controlled flow rate, which is guided out from the pipe 48, merges with the pipe 46 to which the ammonia base liquid is guided. The ammonia base liquid and the dilution water are mixed in the pipe 46 to form ammonia of a predetermined concentration. The ammonia that has been mixed to have the predetermined concentration is pressurized with the reducing-agent supplying pump 45 and pumped out to the pipe 49. The ammonia of the predetermined concentration that has been guided out to the pipe 49 is guided to the individual nozzles 13 from the individual flow-rate control valves 15 and is sprayed into the exhaust gas (fluid) therefrom.

As has been described above, the control system of the NOx removal device according to this embodiment, the NOx removal device provided with the same, the boiler plant provided with the same, and the method of controlling the NOx removal device afford the following operational advantages.

The flow rate of the dilution water (diluting agent) to be mixed with ammonia (reagent) is controlled with the dilution-water-flow-rate control valve (reagent-concentration controlling means) 44. Accordingly, the concentration of ammonia can be changed without changing the flow rate of ammonia to be introduced to the exhaust gas (fluid). Therefore, the droplet size of the ammonia to be sprayed into the exhaust gas can be kept small and substantially uniform.

In addition, in the case in which concentration control of ammonia to be sprayed into the exhaust gas is added, the droplet size of ammonia sprayed (introduced) into the exhaust gas can be kept small and substantially uniform. Accordingly, ammonia sprayed into the exhaust gas can be sufficiently evaporated. Therefore, the NOx removal efficiency of the NOx removal device can be further enhanced.

Note that, although the flow rate of the dilution water guided out from the pipe 48 to the pipe 46 has been described as being controlled with the dilution-water-flow-rate control valve 44 in this embodiment, the present invention is not limited thereto, and the discharge level of the dilution-water supplying pump may be controlled instead of the dilution-water-flow-rate control valve 44.

Figure 10:
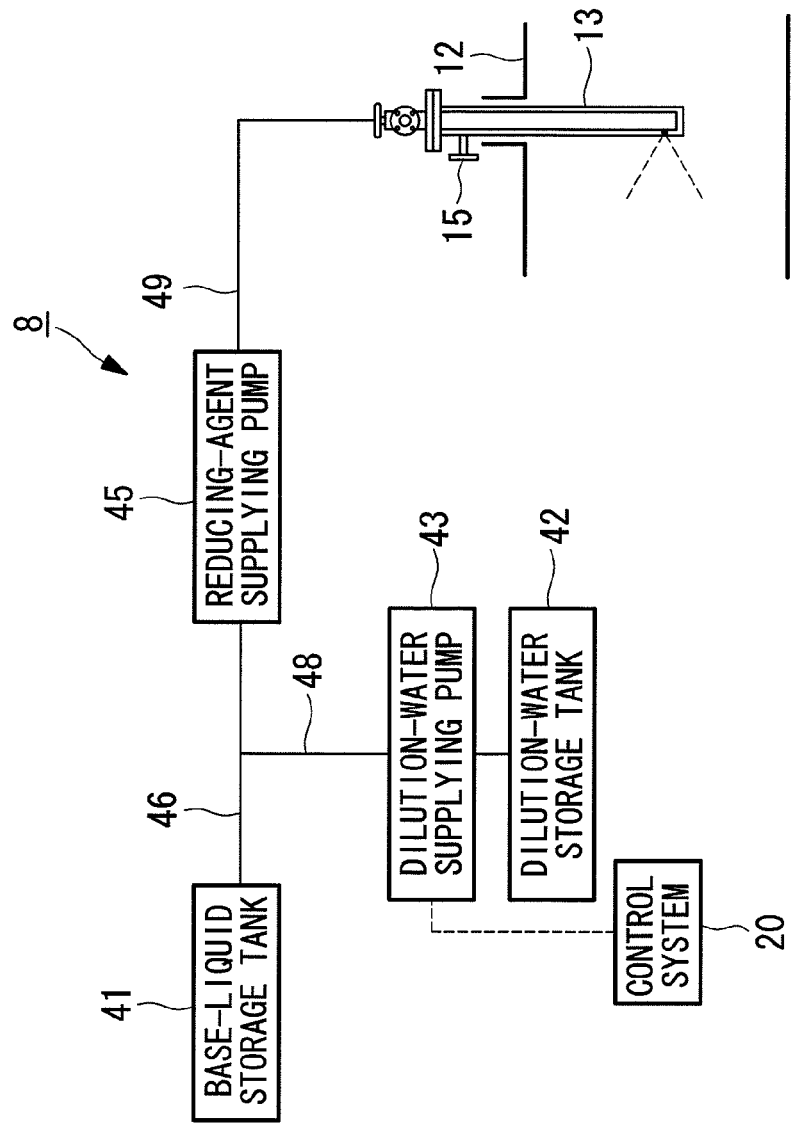
FIG. 10 is a first modification of the NOx removal device provided with the reagent-concentration controlling means according to the second embodiment of the present invention.

FIG. 10 is a configuration diagram showing, in outline, a NOx removal device provided with reagent-concentration controlling means as a modification 1 of this embodiment.

The discharge level of the dilution-water supplying pump (reagent-concentration controlling means) 43 is controlled with the dilution-water-flow-rate-control-valve control device (not shown) provided in the control system 20. The dilution water whose discharge level is controlled with the dilution-water-flow-rate-control-valve control device is guided from the dilution-water supplying pump 43 to the pipe 48. The dilution water with the controlled discharge level flowing in the pipe 48 merges with the pipe 46.

Figure 11:
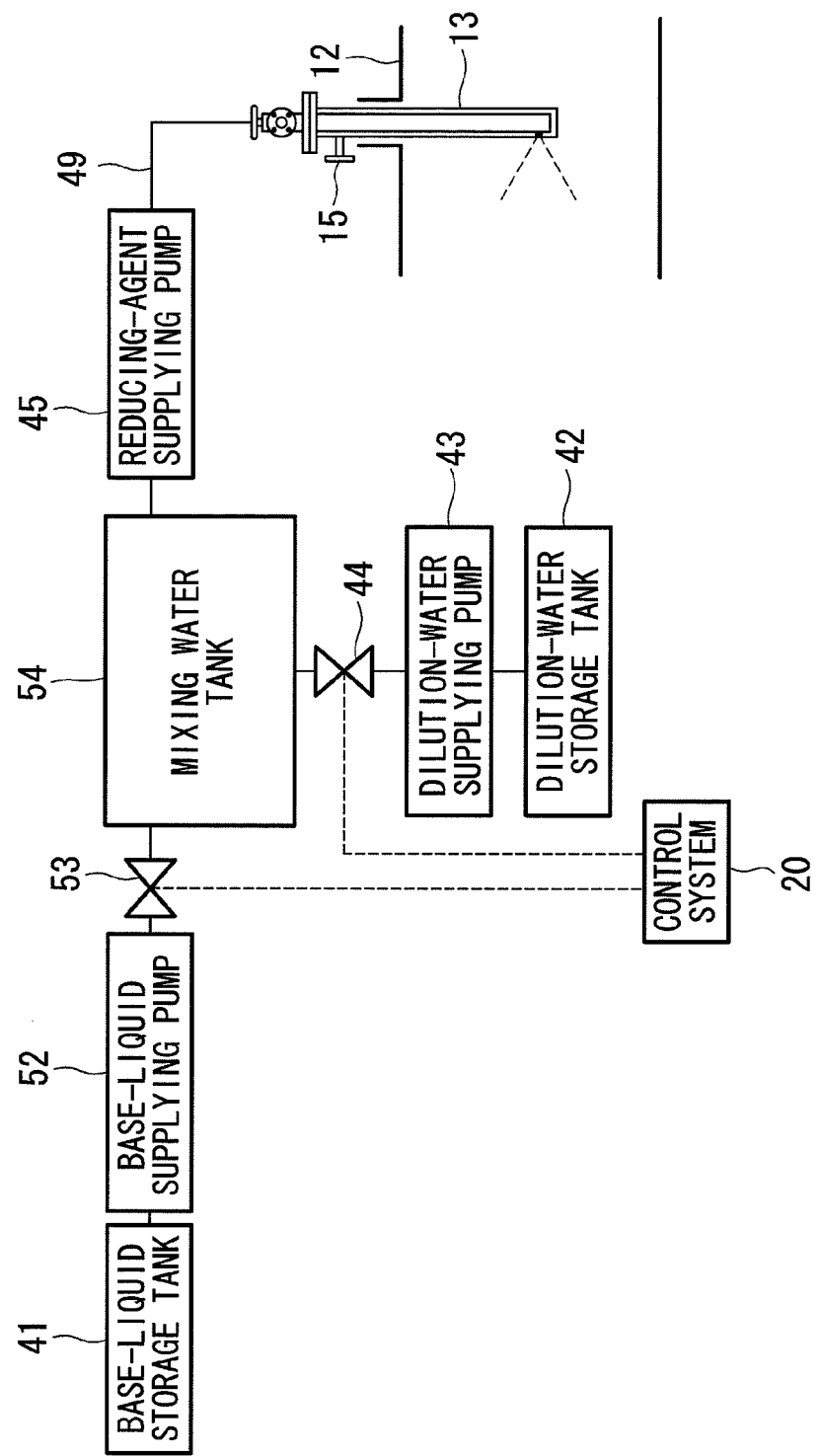
FIG. 11 is a second modification of the NOx removal device provided with the reagent-concentration controlling means according to the second embodiment of the present invention.

In addition, although the mixing of ammonia in this embodiment has been described as being performed in the pipe 46, the mixing may be performed in a water tank, as shown in FIG. 11.

FIG. 11 is a configuration diagram showing, in outline, a NOx removal device provided with a dilution-water mixing pump as a modification 2 of this embodiment.

A base-liquid supplying pump 52 pressurizes the ammonia base liquid guided from the base-liquid storage tank 41. The ammonia base liquid pressurized with the base-liquid supplying pump 52 is guided to a base-liquid-flow-rate control valve (reagent-concentration controlling means) 53.

The base-liquid-flow-rate control valve 53 controls the flow rate of the ammonia base liquid guided from the base-liquid supplying pump 52. The degree of opening of the base-liquid-flow-rate control valve 53 is controlled by the dilution-water-flow-rate-control-valve control device (not shown) provided in the control system 20.

A mixing water tank 54 is where the ammonia base liquid and the dilution water are mixed. The ammonia base liquid whose flow rate is controlled by passing through the base-liquid-flow-rate control valve 53 and the dilution water whose flow rate is controlled by passing through the dilution-water-flow-rate control valve 44 (reagent-concentration controlling means) are mixed in the mixing water tank 54. Ammonia reaches a predetermined concentration by allowing the ammonia base liquid and the dilution water to mix in the mixing water tank 54. The ammonia of the predetermined concentration is guided from the mixing water tank 54 to the reducing-agent supplying pump 45.

Figure 12:
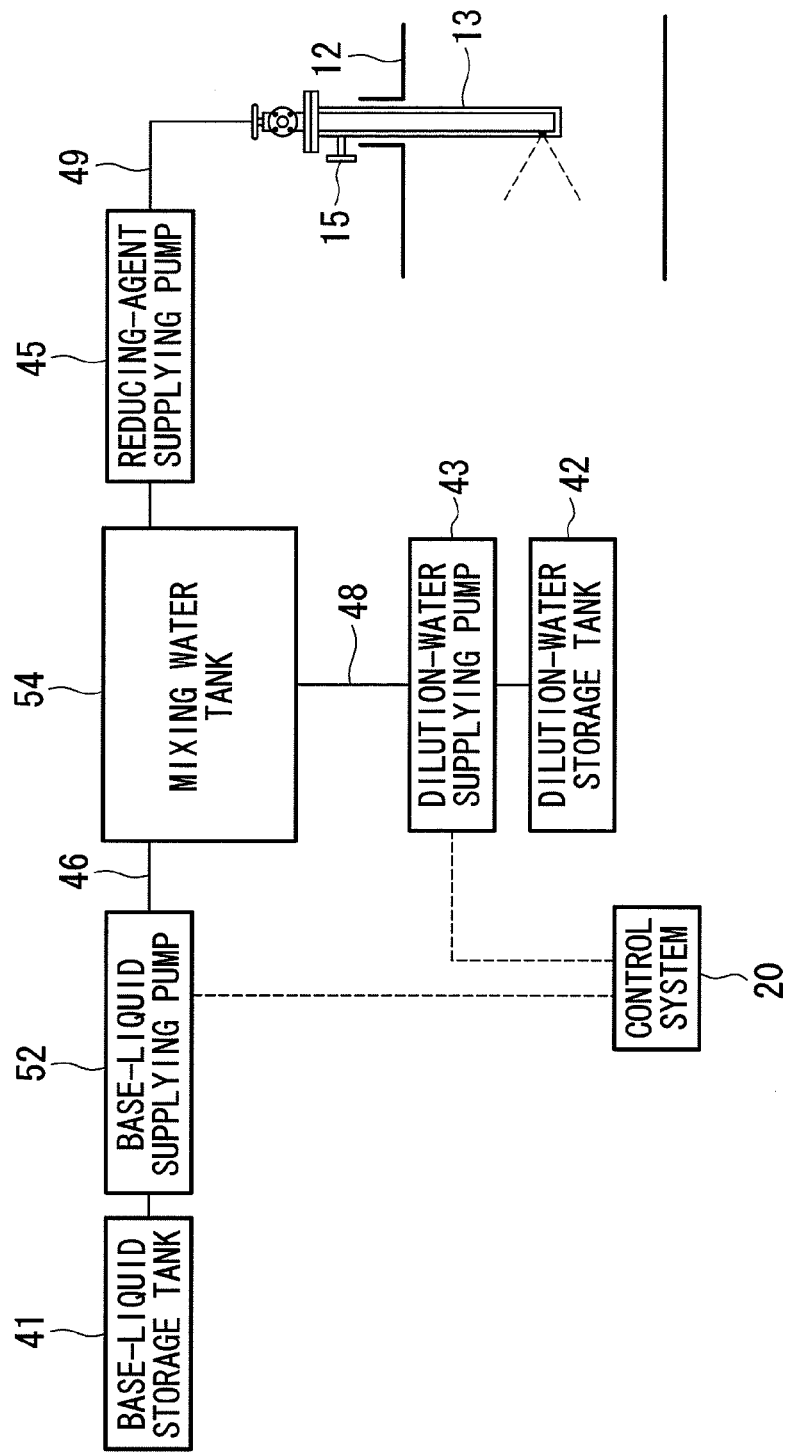
FIG. 12 is a third modification of the NOx removal device provided with the reagent-concentration controlling means according to the second embodiment of the present invention.

In addition, in the case in which the ammonia and the dilution water are mixed in the mixing water tank 54, the predetermined concentration of ammonia may be prepared by controlling the discharge levels of the base-liquid supplying pump (reagent-concentration controlling means) 52 and the dilution-water supplying pump (reagent-concentration controlling means) 43 with the dilution-water-flow-rate-control-valve control device (not shown), as shown in FIG. 12.

Third Embodiment

A third embodiment of the present invention will be described below. A control system of a NOx removal device according to this embodiment, a NOx removal device provided with the same, a boiler plant provided with the same, and a method of controlling a NOx removal device differs from those of the first embodiment in that ammonium chloride solution is used as the reducing agent, and other components are the same. Therefore, the same reference signs are given to the same structures and control methods, and descriptions thereof will be omitted.

Figure 13:
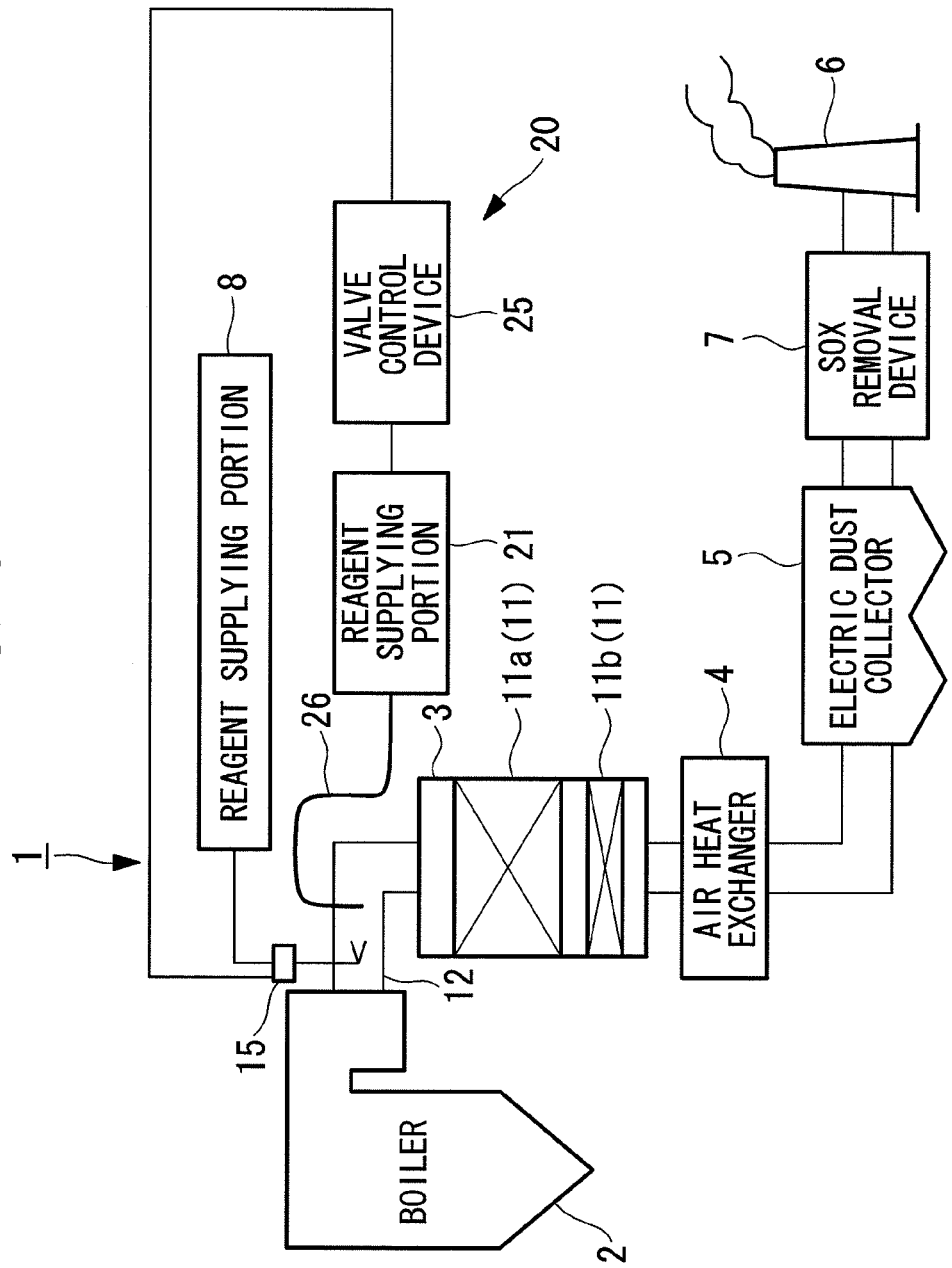
FIG. 13 is a configuration diagram showing, in outline, a boiler plant provided with a NOx removal device according to a third embodiment of the present invention.

FIG. 13 is a configuration diagram showing, in outline, a boiler plant provided with a NOx removal device according to the third embodiment of the present invention.

The NOx removal device 3 is provided with a NOx removal catalyst 11a and a mercury-oxidizing catalyst 11b as the catalysts 11. Ammonium chloride solution is used as the reducing agent (reagent).

A SOx removal device 7 removes sulfur contained in the exhaust gas.

The NOx removal catalyst 11a removes nitrogen oxides in the exhaust gas by causing the exhaust gas sprayed with aqueous ammonium chloride solution, which is the reducing agent, to pass therethrough. The exhaust gas from which the nitrogen oxides have been removed with the NOx removal catalyst 11a is guided to the mercury-oxidizing catalyst 11b. Mercury in the exhaust gas guided to the mercury-oxidizing catalyst 11b reacts with the ammonium chloride solution sprayed into the exhaust gas, thus forming mercury (II) chloride and water.

The SOx removal device 7 removes sulfur from the exhaust gas from which dust has been removed with the electric dust collector 5. The exhaust gas from which sulfur has been removed with the SOx removal device 7 is guided outside the boiler plant 1 from the chimney 6.

As has been described above, the control system of the NOx removal device according to this embodiment, the NOx removal device provided with the same, the boiler plant provided with the same, and the method of controlling the NOx removal device afford the following operational advantages.

The concentration distribution of the ammonium chloride solution (reagent) sprayed (introduced) into the exhaust gas (fluid) is controlled. Accordingly, the exhaust gas sprayed with the ammonium chloride solution can sufficiently be reacted with the catalysts (catalyzing portions) 11a and 11b. Therefore, it is possible to provide the NOx removal device 3 that can efficiently remove mercury in the exhaust gas together with the removal of the nitrogen oxides.

REFERENCE SIGNS LIST 1 boiler plant
3 NOx removal device
15 flow-rate control valve (reagent introducing means)
20 control system
21 temperature measuring device
23 reagent-concentration-distribution calculating device (reagent-concentration calculating portion)
24 reagent-spraying-level setting device (reagent-flow-rate determining portion)
25 valve control device (reagent-introducing-means control portion)

The invention claimed is:
1. A control system for a NOx removal device, wherein the NOx removal device comprises:
reagent introducing means for introducing a reducing agent into exhaust gas which is discharged from a boiler and flowing inside a duct, the reducing agent for reducing NOx in the exhaust gas, and a NOx removing portion which has a catalyst and removes NOx from the exhaust gas into which the reducing agent has been introduced, and the control system for the NOx removal device comprises:

a temperature measuring device that measures a temperature distribution of the exhaust gas inside the duct, the reducing agent having been introduced into the exhaust gas;

a reagent-concentration calculating portion that calculates a concentration distribution of the reducing agent introduced into the exhaust gas based on the temperature distribution determined at the temperature measuring device;

a reagent-flow-rate determining portion that determines a desired flow rate of the reducing agent to be introduced into the exhaust gas by the reagent introducing means in accordance with the concentration distribution calculated at the reagent-concentration calculating portion when the concentration distribution does not reach a desired concentration distribution; and a reagent-introducing-means control portion that controls the reagent introducing means so as to introduce the reducing agent into the exhaust gas at the desired flow rate determined at the reagent-flow-rate determining portion.

2. The control system for the NOx removal device according to claim 1, further comprising reagent-concentration controlling means for controlling a concentration of the reducing agent introduced into the exhaust gas with the reagent introducing means, wherein the reagent-concentration controlling means controls a flow rate of a diluting agent to be mixed with the reducing agent.

3. The control system for the NOx removal device according to claim 1, wherein the temperature measuring device is provided with a photoreceptor provided at one wall surface of a flow path in which the exhaust gas flows; a dispersive element that disperses light that enters the photoreceptor, where light emitted from another wall surface passes through the exhaust gas and enters the photoreceptor; a detecting portion that detects an actual measured absorption spectrum of the exhaust gas from the light dispersed at the dispersive element; and a temperature calculating portion that calculates the temperature of the exhaust gas from the actual measured absorption spectrum detected with the detecting portion.

4. The control system for the NOx removal device according to claim 1, wherein the reagent introducing means comprises a plurality of nozzles to which the reducing agent whose flow rate is controlled with the control system is guided.

5. The control system for the NOx removal device according to claim 4, wherein the reducing agent is one of ammonia, a mixture of ammonia and hydrogen chloride, an aqueous ammonia solution, an aqueous urea solution, and an aqueous ammonium chloride solution.

6. A boiler plant comprising:

a boiler that discharges exhaust gas;

the control system for the NOx removal device according to claim 4 to which the exhaust gas discharged from the boiler is guided; and a heat exchanger that performs heat exchange with the exhaust gas that has flowed out from the NOx removal device.

7. A method of controlling a NOx removal device, wherein the NOx removal device comprises:

a reagent introducing means for introducing a reducing agent into exhaust gas which is discharged from a boiler and flowing inside a duct, the reducing agent being provided to reduce NOx in the exhaust gas; and a NOx removing portion which has a catalyst and removes NOx from the exhaust gas into which the reducing agent has been introduced, the method comprising:

a temperature measuring step of measuring a temperature distribution of the exhaust gas inside the duct, the reducing agent having been introduced into the exhaust gas;

a reagent-concentration calculating step of calculating a concentration distribution of the reducing agent introduced into the exhaust gas based on the temperature distribution determined in the temperature measuring step;

a reagent-introducing-flow-rate determining step of determining a desired flow rate of the reducing agent to be introduced into the exhaust gas in accordance with the concentration distribution calculated in the reagent-concentration calculating step when the concentration distribution does not reach a desired concentration distribution; and a reagent introducing means controlling step of introducing the reducing agent into the exhaust gas at the desired flow rate determined in the reagent-introducing-flow-rate determining step.

8. The method of controlling the NOx removal device according to claim 7, wherein the reducing agent is one of ammonia, a mixture of ammonia and hydrogen chloride, an aqueous ammonia solution, an aqueous urea solution, and an aqueous ammonium chloride solution.

* * * * *